March 4, 1958     J. P. STEIBEL     2,825,427
HYDRAULIC DASHPOT
Filed Aug. 13, 1953     2 Sheets-Sheet 1
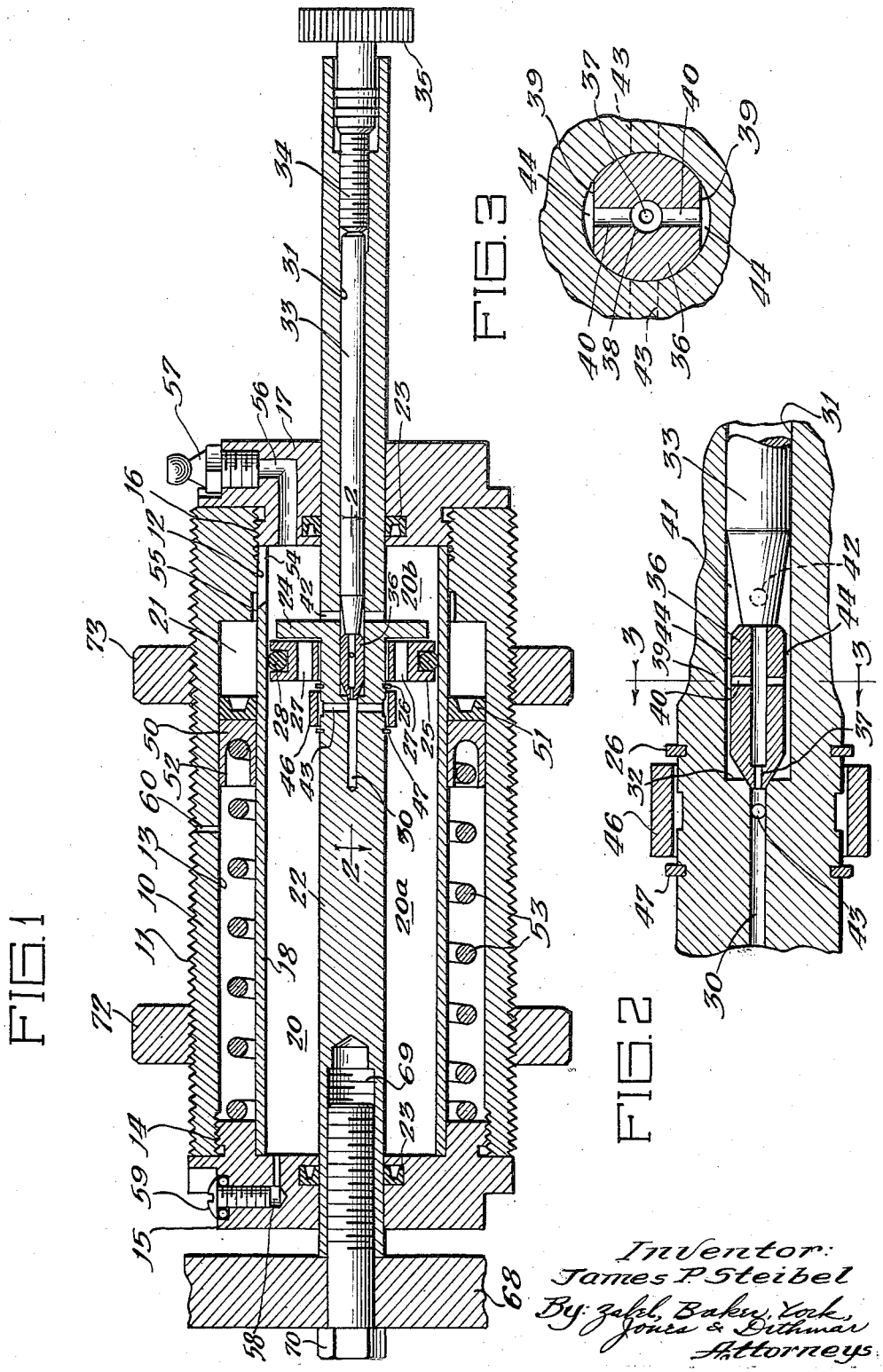
Inventor:
James P. Steibel March 4, 1958  J. P. STEIBEL  2,825,427
HYDRAULIC DASHPOT
Filed Aug. 13, 1953  2 Sheets-Sheet 2

Inventor:
James P. Steibel
By: Zabel, Baker, York,
Jones & Dithmar
Attorneys

United States Patent Office 2,825,427
Patented Mar. 4, 1958

2,825,427

HYDRAULIC DASHPOT

James P. Steibel, Racine, Wis., assignor to The Dumore Company, Racine, Wis., a corporation of Wisconsin Application August 13, 1953, Serial No. 373,936

5 Claims. (Cl. 188—96)

This invention relates to an improved hydraulic control means, of the dash pot type, suitable for use with a machine tool, and in particular, to an improved dash pot and dash pot assembly.

The term "dash pot assembly" as used herein includes both the dash pot and the parts associated therewith by means of which the dash pot itself may be mounted for cooperation with the element to be controlled thereby.

The invention is described herein as applied to an electrically driven drill having a pneumatic or hydraulic feed, the controlled element being the drill spindle, or the quill in which the spindle is mounted, but it is understood that the invention is equally adapted for use in controlling the feed or movement of analogous elements of other types of automatic machines or machine tools, such, for example, as milling machines, surface grinders, and spinning tools.

The usual dash pot comprises a cylinder, a piston, a check valve permitting substantially free movement of the piston in one direction, and a by-pass which provides controlled movement of the piston in the other direction. Thus, a controlled operative stroke and a quick return stroke are provided, this being the characteristic dash pot action. The dash pot assembly may also include a fluid reservoir and fluid ballasting means.

An object of the present invention is to provide a self-contained control unit which requires no outside fluid connections, and in this connection, I have provided a dash pot having an improved valve and by-pass arrangement which are contained within the piston assembly, rather than in the cylinder wall, thus enabling me to provide a fluid reservoir in the form of a concentric cylindrical chamber surrounding the dash pot cylinder per se.

A further object is to provide a hydraulic control unit which can be very accurately controlled as to minimum speed of its operative stroke.

A still further object is to provide, in a hydraulic control unit of the type indicated, an improved needle valve construction by means of which the bypass can be controlled and regulated with accuracy.

Whereas the usual needle valve affords sensitive control of aperture area, the accuracy of regulation varies widely from minimum aperture area to maximum aperture area; the regulation is least accurate at minimum aperture area. This characteristic renders it very difficult to set up a tool for a minimum feeding rate, as in the drilling of hard steels. According to the present invention, I provide a series of separate valve needle elements each having an opening, or control bore, of different size, thus providing a graduated series of minimum aperture areas. By selecting one or the other of these elements for use in the needle valve structure, any one of a series of predetermined minimum speeds, or feeding rates, can be obtained with extreme accuracy. For somewhat greater speeds, which correspond to aperture areas which can be regulated with greater accuracy, my improved construction provides the ease of adjustment and sensitivity of control which is characteristic of the standard type of needle valve. Thus, I have provided a hydraulic control which is especially well adapted for use in power drills for the reason that both low and high feeding rates can be provided with ease and with accuracy.

Another object is to provide, in a hydraulic control, improved bypass means which are not subject to clogging at minimum aperture areas. In this connection, my invention contemplates the provision of a control port having a circular cross section in combination with a filter port of substantially annular cross section, thus providing low resistance filtering means.

A further object is to provide a dash pot embodying improved filtering means to the end that valve wear may be substantially reduced.

Still another object is to provide an improved ballasting means for a dash pot.

A still further object is to provide a hydraulic control unit which embodies novel and improved means to provide a lost motion connection between the dash pot and the controlled element. As applied to a machine tool, such a unit permits the tool to be advanced rapidly to the work after which the feed is controlled by the dash pot.

Heretofore the longitudinal dimension of the dash pot assembly has had to be sufficient to accommodate the dash pot cylinder, the length of the piston stroke, and the additional movement of the parts which is provided by the lost motion connection. In other words, the over-all length dimension is equal, roughly, to the cylinder length, the stroke length, and the lost motion movement.

Another object of the present invention is to provide a dash pot assembly of reduced over-all length. According to the present invention, the parts are arranged in such a manner that the over-all length dimension is equal, roughly, to the sum only of the stroke movement and of the lost motion movement. This is accomplished by mounting the dash pot so that the piston is stationary and the cylinder moves, and in constructing the cylinder in such a manner as to provide a lost motion connection between the cylinder and the spindle or other part, the movement of which is to be controlled.

By providing a self-contained dash pot unit which requires no outside connection, I am thus enabled to mount the cylinder for movement with respect to a stationary piston and other stationary parts of the assembly.

Other objects, features and advantages will become apparent as the description proceeds.

With reference now to the drawings in which like reference numerals designate like parts:

Fig. 1 is a longitudinal axial section showing a preferred embodiment of my invention;

Fig. 2 is an enlarged longitudinal section taken along line 2—2 of Fig. 1;

Fig. 3 is a transverse section taken along line 3—3 of Fig. 2;

Figure 4:
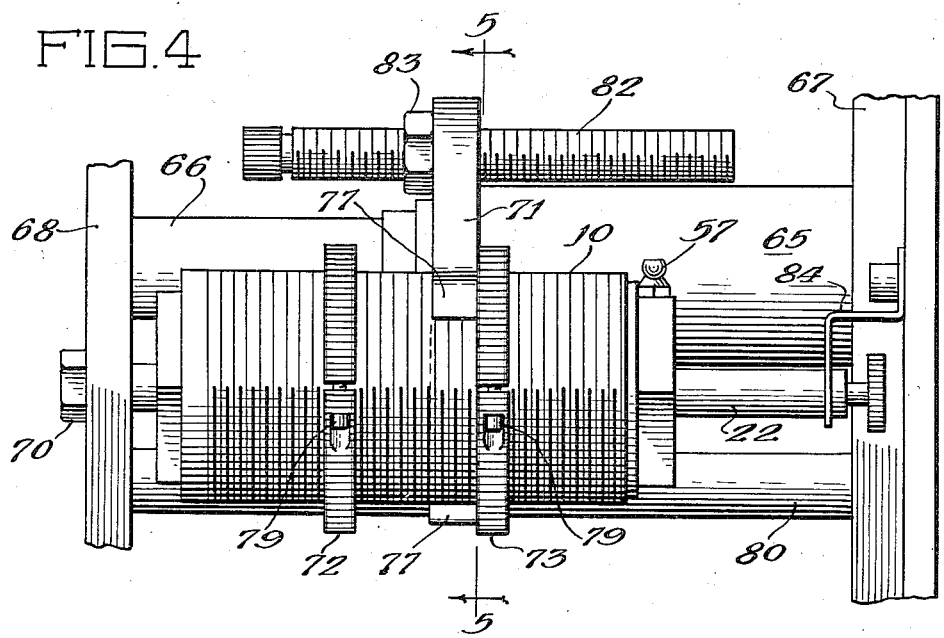
Fig. 4 is an elevation showing the dash pot assembly, and showing the manner in which the unit is mounted and connected with the controlled element.

With reference now to Fig. 1, the dash pot unit comprises a body member 10 in which is mounted a cylinder 18. Disposed within said cylinder and cooperating therewith is a piston 25 which divides the interior 20 of the cylinder 18 into rear and front expansible chambers 20a and 20b respectively. The piston 25 is slidably mounted on a piston stem 22, the cylinder 18, and body member 10 being relatively movable with respect to the piston stem 22, and vice-versa. The flow of fluid through the by-pass from chamber 20a to chamber 20b is controlled by a needle valve carried in the piston stem 22, and which includes a separate valve needle element 36. The structure of the cylinder 18 and the body member 10 will now be described.

The body member 10 is a generally cylindrical element, the external surface of which may be formed with a screw thread 11. The body is provided with an inner bore surface 12 and a counterbore surface 13, the latter being provided at the rear end with screw threads 14. A rear end member 15 closes the rear end of the cylinder and engages the threads 14.

The front end of the bore surface 12 is provided with threads 16 to accommodate a front end member 17 which closes the front end of the body member 10.

The cylinder 18 is in the form of a hard drawn brass tube, the front end of which is press-fitted into the inner bore surface 12 of the body 10, and the rear end of which is press-fitted into a bore surface 19 in the rear end member 15, the bore surfaces 12 and 19 serving to maintain the cylinder member 18 is round. Thus, the cylinder member 18 divides the interior of the body 10 into a main cylinder chamber 20 and a concentric cylinder chamber or reservoir 21.

The piston stem 22 extends through the end members 15 and 17 and is mounted for sliding movement therein. Suitable liquid seals 23 are provided as shown. This piston stem is provided with a flange 24, and the piston 25 is slidably mounted on the piston stem adjacent the flange 24. It will be observed that there is a slight clearance between the piston stem 22 and the piston 25 so as to provide what might be termed a floating movement of the piston with respect to the stem. This free longitudinal movement of the piston is confined in one direction by a snap ring 26 and in the other direction by the flange 24.

Both the check valve and the by-pass are located within the piston assembly, rather than in the cylinder wall, so as to permit the utilization of ordinary tubing for the cylinder 18. The advantage of this construction is that it avoids machining, since the hard drawn brass tubing provides a very satisfactory cylinder wall.

The check valve comprises the piston 25, the flange 24, and one or more vents 27 which are formed in the piston. The flange 24 overlies the vents 27, and the arrangement is such that the free longitudinal movement of the piston with respect to the piston stem 22 is utilized to provide the usual check valve action.

Assuming that the dash pot is so mounted that the stem 22 is stationary and the body is movable, movement of the body to the right, from the position shown in Fig. 1, can be termed the operative stroke, and movement of the body to the left, from the position shown in Fig. 1, can be termed the return stroke.

On the operative stroke, fluid in the chamber 20a will be compressed, thus forcing the piston 25 against the flange so as to cut off the vents 27. On the inoperative stroke, the fluid in chamber 20b will be compressed, urging the piston rearwardly away from the flange and opening the passageway through the vents. Thus, on the return stroke, the vents 27 are opened and there is very little resistance, due to their comparatively large area, making for a quick return. A suitable seal 28 is provided between the piston 25 and the cylinder 18.

Relative movement of the body and cylinder with respect to the piston on the operative stroke is controlled by the by-pass means which, as indicated above, is disposed within the piston stem 23. The by-pass comprises a series of passageways, bores and chambers, and also includes a needle valve which will now be described.

The piston stem is provided with a bore 30 and a counterbore 31, the latter providing an end shoulder 32. Disposed within the counterbore 31 is a valve stem 33 which is held in place by a regulating screw 34 having a knurled head 35. The separate valve needle element 36 is disposed forwardly of the valve stem 33 and is confined between that valve stem and the end shoulder 32, substantially as shown in Fig. 1. As shown in Figs. 1 and 2, the valve needle element 36 is a more or less cylindrical element with a tapered rear end, and is provided with a small bore, or control bore 37 which opens into a counterbore 38 of substantially larger dimensions. As shown in Fig. 3, the valve needle element is provided with slabbed slides 39 which cooperate with the surface of the counterbore 31 to form longitudinal passageways 44. Transverse passageways 40 are formed in the valve needle element 36 and provide communication between the counterbore 38 thereof and the aforesaid longitudinal passageways 44.

The rear end portion of the valve stem 33 is of reduced dimensions to provide a chamber 41 which communicates with the longitudinal passageways 44. Transverse passageways 42 are formed in the piston stem 22 which provides communication between the chamber 41 and the right end of the cylinder chamber 20. Transverse passageways 43 are formed in the piston stem 22 at a point rearwardly of the flange 24. These passageways intersect the bore 30. Thus, communication between the rear and front portions of the main cylinder chamber 20 is provided by the various passageways, bores and chambers identified by the reference numerals 43, 30, 37, 38, 40, 44, 41 and 42.

The smallest of these openings is the control bore 37; it is the cross sectional area of this bore that determines the minimum speed of the operative stroke when the separate valve needle element 36 is held firmly against the end shoulder 32 by the valve stem 33.

Different minimum speeds can be obtained by substitution of different valve needle elements having control bores of different diameters.

Speeds greater than the minimum speed can be obtained by loosening the regulating screw 34 which causes the pressure in the rear end of the cylinder to urge the valve needle element forwardly to provide a clearance between the tapered front surface thereof and the corner edge defined by the intersection of the control bore 37 and the end shoulder 32. Thus, the passageway afforded by the control bore may be by-passed either in whole or in part, since the hydraulic fluid will flow directly from the bore 30 into the longitudinal passageways 44. The tapered front end of the valve needle element 36 is preferably of smaller diameter than the bore 30 so that a good valve seat will be provided.

From the foregoing it will be seen that when the piston stem 22 is maintained stationary and the body 10 shifted forwardly or to the right as shown in Fig. 1, the rate of movement can be very closely controlled. On the other hand, when the body is shifted rearwardly, the piston 25 is displaced forwardly against the snap ring 26 with the result that there is relatively little resistance to relative movement of the parts on the return stroke.

Means are provided to prevent clogging of the control bore by impurities or solid particles which may be suspended in the hydraulic fluid. This means comprises a filter ring 46 which surrounds the piston stem 22 at a point opposite the transverse passageways 43, the filter ring being confined between the snap ring 26 and a second snap ring 47 as shown in Fig. 1. The internal diameter of the filter ring 46 is very closely controlled with respect to the outer diameter of the piston ring 22 at that point. For instance, with a control bore diameter of .008 inch, the radius of the inner surface of the control ring may be maintained .002 inch greater than the radius of the piston stem 22. Thus, the maximum clearance between the filter ring and the piston stem will be .004 inch which clearance is only one-half the diameter of the control bore.

It is not necessary to provide corresponding filtering means forwardly of the piston since during the return stroke practically all of the fluid will pass through the vents 27 and therefore there is very little likelihood of any particles becoming lodged in the control bore in a return-stroke.

Reservoir means are provided to maintain the main cylinder chamber 20 full of the hydraulic fluid, this reservoir means including the reservoir 21 and an annular piston 50 which is disposed therein. A suitable sealing ring 51 is provided for the piston 50. The rear surface of the piston 50 is provided with a groove which receives a spring 53, the latter being confined between the piston 50 and the rear end member 15. Thus, a ballast pressure is maintained on all of the fluid in the system. Communication is provided between the reservoir 21 and the main cylinder chamber 20 by means of a slot 54 formed in the front edge of the cylinder member 18, the body member 10 being provided with an intermediate counterbore 55 which provides a passageway communicating with the slot 54.

To permit the device to be filled, a passageway 56 is provided in the front end member 17, the passageway terminating in a suitable fitting 57 so that fluid under pressure may be forced into the main cylinder chamber 20 and the reservoir 21 against the pressure of the ballast spring 53. Any air in the system may be vented, during the filling operation, by means of the vent passageway 58 formed in the rear end member 15, and by the vent 60 formed in the body member 10. The vent passageway 58 is normally closed by a vent screw 59 and a suitable sealing washer. The screw is loosened during the filling operation until all air is vented from the main cylinder chamber 20, after which it is tightened to close the vent. Continued supply of fluid under pressure to the system through the fitting 57 will cause displacement of the annular piston 50 until such time as the vent 60 is exposed, thus causing any air in the reservoir to be vented.

Figure 5:
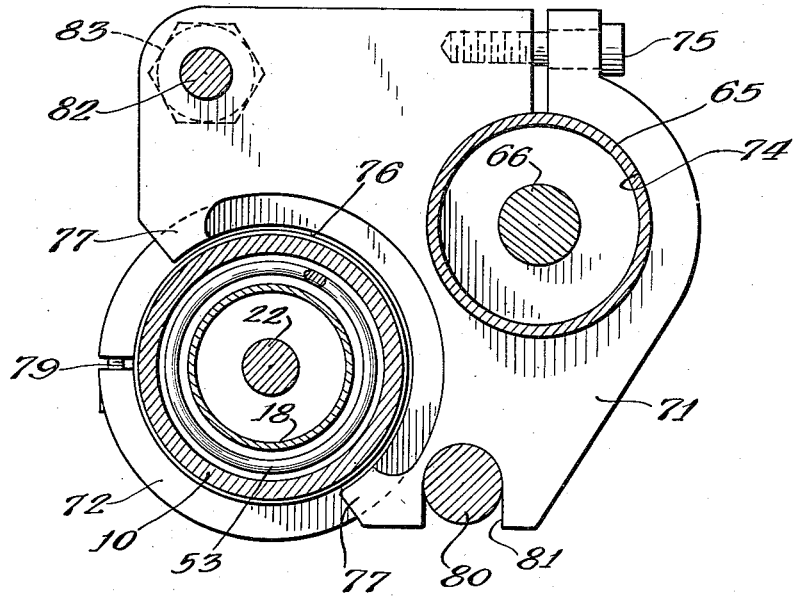
Fig. 5 is a vertical section taken along line 5—5 of Fig. 4.

The dash pot assembly including the preferred manner of mounting the same so as to obtain a lost motion connection between the dash pot unit and the controlled element, is shown in Figs. 4 and 5. The controlled element may be in the form of a sleeve or quill 65 in which a drill spindle 66 is rotatably mounted by suitable bearings, not shown. The sleeve and spindle are mounted for reciprocation in a suitable structural part 67 of the machine in which the hydraulic control is installed. The reference numeral 68 designates another structural part of the machine or special mounting plate, which is spaced from the structural part 67. As shown in Fig. 1 the rear end of piston stem 22 is provided with a tapped bore 69 which is adapted to receive a bolt 70. The bolt 70 passes through the part 68 and thus serves as a means by which the piston stem 22 may be secured to the part 68 and thus serves as a means by which the piston stem 22 may be secured to the part 68 and supported therefrom. Thus, the piston stem is mounted in a fixed and stationary position; since the body member 10 and its associated parts are slidably mounted on the piston stem, the whole dash pot unit is therefore supported by bolt 70.

The lost motion connection between the controlled element 65 and the body member 10 is provided by a yoke 71 which is carried by the controlled element 65 and by split nuts 72 and 73 which are mounted on the body member 10.

The yoke may be secured to the controlled element 65 in any suitable manner; as shown in Fig. 5, the yoke is in the form of a plate which is provided with a circular opening 74 through which the sleeve 65 extends. A suitable clamp 75 secures the parts to each other in fixed relationship, and snap rings, not shown, may also be employed, if desired.

The yoke 71 may also be cut away, as indicated by the reference numeral 76 so as to provide diametrically opposed shoulders 77 which embrace the body member 10. Of course, clearance is provided between the yoke and the body member to permit relative axial movement of the parts, but this movement is limited by the split nuts 72 and 73. Thus, a lost motion connection is provided between the yoke 71 and the body member 10 which is limited in extent by the spacing between the nuts 72 and 73. The advantage of providing threaded nuts and of providing threads 71 on the body member 10 is that a very fine adjustment can be made of the spacing between the nuts; however, where this refinement is not desired, ordinary clamp rings can be utilized which will cooperate with a smooth surfaced body member 10. In order to maintain the nuts in fixed position, I prefer to employ split nuts which embody clamp screws 79.

A guide rod 80 may preferably be mounted between the parts 67 and 68, which cooperates with a slot 81 formed in the yoke 71 to maintain the desired clearance between the yoke 71 and the body member 10. The yoke may also be provided with an adjustable stop screw 82 which can be locked in a given position by a jam nut 83 in order to limit the stroke of the dash pot. The stop screw 82 abuts the structural part 67 to limit the movement of the body member 10 and the controlled element 65. However, suitable limit switches, not shown, may be provided, which are engaged by a stop screw 82 or by the yoke 71, to shut off or to initiate the pneumatic or hydraulic feed for the controlled element 65.

In order to avoid undue flexural stress of the piston stem 22, a bracket 84 may be provided to support the front end thereof, when the parts are mounted in horizontal position, as shown. This may be dispensed with when the dash pot is suspended vertically from the structural part 68.

In operation, the dash pot unit is mounted so that the piston stem 22 is stationary and the body member 10 is free to move with characteristic dash pot action; that is, with controlled forward movement, and with relatively free rearward movement. However, the spacing between the nuts 72 and 73 permits a certain amount of lost motion of the controlled element with respect to the dash pot. In other words, the nuts 72 and 73 are set to provide the desired amount of lost motion, and the stop screw is set to control the length of the operative stroke of the dash pot.

To summarize the operation of the device as a whole, in setting up the tool or other device in which the dash pot is installed, the proper valve needle element 36, the control bore 37 of which corresponds to the minimum speed desired, is first selected, and is positioned within the counterbore 31. Then the valve stem 33 and the regulating screw 34 are inserted into the counterbore and the regulating screw tightened up so that the valve needle element will be seated upon the valve seat 32. Then, if lost motion is desired, the nuts 72 and 73 are set accordingly; if lost motion is not desired, they are tightened up against the opposite sides of the yoke 71. The stop screw 82 is also adjusted as indicated above for the desired stroke length.

In the retracted position of the controlled element 65, the yoke 71 will be positioned adjacent the nut 72. As the feeding means is actuated, the controlled element 65 will move freely to the right until the yoke 76 engages the nut 73; then the body member 10 will be displaced to the right by a force exerted thereon by the yoke 71. However, the movement of the controlled element 65 will be checked by the dash pot action with the result that the speed or rate of feed will be controlled until such time as the stop screw 82 abuts the part 67 or a suitable limit switch.

This controlled motion is obtained by the pressure exerted on fluid in the chamber 20a. This pressure closes the check valve 27—24, with the result that the hydraulic fluid is forced to traverse the by-pass which includes the control bore 37. Due to the filter ring 46, the control bore 37 cannot become clogged with the result that there is no danger of irregular or interrupted motion due to clogging. The arrangement shown provides a very accurate control of the minimum speed; as an example, as applied to a pneumatic feed electric drill, I find that a minimum speed of three inches per minute can be obtained with a variation of only plus or minus one-half of one percent.

When a somewhat greater speed is desired, or, for instance in drilling softer steels, the aperture area can be increased by loosening the regulating screw 34.

As the controlled element 65 returns to its original position, the lost motion between the yoke 71 and the nut 72 and 73 will first be taken up, after which the dash pot unit will be actuated in its return stroke. On the return stroke the fluid pressure in chamber 20b will cause the check valve 27—24 to open with the result that the return stroke will be rapid.

By virtue of the reservoir 21 and the ballasting means 50—53, the hydraulic fluid is always maintained under a positive pressure which prevents accumulation or formation of any air bubbles within the cylinder chamber 20. Air bubbles are undesirable because they cause irregular movement of the piston, which results in stuttering of the drill.

I claim:

1. A hydraulic control comprising a body member and end members cooperating therewith to provide a hollow cylindrical structure, a tubular member disposed within said hollow cylindrical structure, said end members being formed to provide seats for the ends of said tubular member, said tubular member dividing the interior of said hollow cylindrical structure into a cylindrical chamber and an annular reservoir chamber surrounding the same, piston means disposed within said tubular member and cooperating therewith to divide the interior thereof into a front expansible chamber and a rear expansible chamber, a check valve located on said piston means to provide substantially free flow of a hydraulic fluid contained in said cylindrical chamber from said front expansible chamber to said rear expansible chamber, thereby providing a quick return stroke, and by-pass means including a needle valve located in said piston means to provide controlled flow of said hydraulic fluid from said rear expansible chamber to said front expansible chamber, thus providing an operating stroke of controlled speed, means providing unimpeded communication between said reservoir chamber and one of said expansible chambers, an annular piston disposed within said reservoir chamber, and spring loading means disposed within said reservoir chamber and behind said annular piston so as to provide a ballasting action on the hydraulic fluid contained within said cylindrical chamber, said tubular member comprising a length of hard drawn brass tubing so as to serve as a liner for said cylindrical chamber.

2. A hydraulic control comprising means providing a closed cylinder chamber, piston means disposed within said cylinder chamber and including a check valve, and by-pass means located in said piston means, said piston means including a piston stem extending through said closed cylinder chamber and beyond the ends thereof, and said by-pass means including a needle valve disposed within said piston stem, a valve seat therefor, said needle valve comprising a valve stem and a separate needle element disposed within said piston stem and confined against said valve seat by said valve stem, said needle element being provided with a control bore to provide a minimum area aperture which corresponds to a minimum rate of advance of said piston on its operative stroke, and said valve means including a regulating screw for regulating the clearance between said valve needle element and its seat so as to provide for greater rates of advance, said piston stem being provided with a flange, and said check valve also including a piston member surrounding and slidably mounted on said piston stem adjacent to said flange, said piston member being provided with an aperture, and said flange overlapping said aperture, so that the passage of fluid through said aperture will be blocked by said flange when said piston member is urged against said flange by the pressure of said fluid, and whereby said aperture permits passage of fluid therethrough when said piston member is displaced in the opposite direction with respect to said flange.

3. A hydraulic control comprising means providing a closed cylinder chamber, piston means disposed within said cylinder chamber and including a check valve, and by-pass means located in said piston means, said piston means including a piston stem extending through said closed cylinder chamber and beyond the ends thereof, and said by-pass means including a needle valve disposed within said piston stem, a valve seat therefor, said needle valve comprising a valve stem and a separate needle element disposed within said piston stem and confined against said valve seat by said valve stem, said needle element being provided with a control bore to provide a minimum area aperture which corresponds to a minimum rate of advance of said piston on its operative stroke, and said valve means including a regulating screw for regulating the clearance between said valve needle element and its seat so as to provide for greater rates of advance, said by-pass means also including a transverse bore located in said piston stem, in combination with a loosely mounted filter ring surrounding said piston stem at a point opposite said transverse bore, the maximum clearance between said filter ring and said piston stem being less than the diameter of said control bore.

4. A hydraulic control comprising means providing a closed cylinder chamber, piston means disposed within said cylinder chamber and including a check valve, and by-pass means located in said piston means, said piston means including a piston stem extending through said closed cylinder chamber and beyond the ends thereof, and said by-pass means including a needle valve disposed within said piston stem, a valve seat therefor, said needle valve comprising a valve stem and a separate needle element disposed within said piston stem and confined against said valve seat by said valve stem, said needle element being provided with a control bore to provide a minimum area aperture which corresponds to a minimum rate of advance of said piston on its operative stroke, and said valve means including a regulating screw for regulating the clearance between said valve needle element and its seat so as to provide for greater rates of advance, means providing an annular reservoir chamber surrounding said closed cylinder chamber and communicating therewith, and a spring-loaded annular piston disposed within said annular reservoir chamber for maintaining a fluid disposed in closed cylinder chamber under a substantially constant pressure to prevent the formation of air bubbles.

5. A self-contained dash pot unit comprising a stationary piston stem, a cylindrical body member slidably mounted on said piston stem, the external surface of said body member being threaded, a pair of nuts engaging said threaded cylindrical member to provide a lost motion connection between the same and a controlled element, said cylindrical body member providing a closed cylindrical chamber and an annular reservoir chamber surrounding the same, said piston stem extending through said cylindrical chamber and beyond the ends of said cylindrical body member, and being provided at a point within said cylindrical chamber with two radially extending members, one of said members being affixed to said piston stem, and the other of said members being slidably mounted on said piston stem adjacent said fixed member, one of said members being provided with a port and cooperating with the other of said members to provide a check valve, and one of said members extending to the wall of said cylinder chamber and serving as a piston, by-pass means located within said piston stem to provide a by-pass around said piston, said by-pass means including a valve needle element having a control bore to provide a minimum aperture area, a filter ring surrounding said piston stem at a point adjacent the intake of said by-pass means, and a spring-biased annular piston disposed in said reservoir chamber so that a hydraulic fluid contained within said cylinder chamber will be maintained under substantially constant pressure.

References Cited in the file of this patent

UNITED STATES PATENTS

| | | |
|---|---|---|
| 456,016 | Canet | July 14, 1891 |
| 1,267,532 | Flentje | May 28, 1918 |
| 1,833,121 | Norton | Nov. 24, 1931 |
| 1,860,756 | Waninger | May 31, 1932 |
| 2,032,189 | Stilling | Feb. 25, 1936 |
| 2,657,595 | Shaff | Nov. 3, 1953 |
| 2,658,588 | Kanuch | Nov. 10, 1953 |

FOREIGN PATENTS

| | | |
|---|---|---|
| 632,497 | Great Britain | Nov. 28, 1949 |